United States Patent
Ashida et al.

(10) Patent No.: US 9,018,871 B2
(45) Date of Patent: Apr. 28, 2015

(54) POWER CONVERSION APPARATUS

(75) Inventors: Takeshi Ashida, Shiga (JP); Hiroshi Hibino, Shiga (JP); Naoto Kobayashi, Shiga (JP); Michihiro Nakagawa, Shiga (JP); Nobuki Kitano, Shiga (JP); Masaki Kouno, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/882,659

(22) PCT Filed: Oct. 26, 2011

(86) PCT No.: PCT/JP2011/074647
§ 371 (c)(1),
(2), (4) Date: Apr. 30, 2013

(87) PCT Pub. No.: WO2012/066914
PCT Pub. Date: May 24, 2012

(65) Prior Publication Data
US 2013/0221884 A1  Aug. 29, 2013

(30) Foreign Application Priority Data

Nov. 16, 2010  (JP) .................. 2010-255687

(51) Int. Cl.
H03K 5/00 (2006.01)
H02P 27/04 (2006.01)
H02M 1/14 (2006.01)
H02P 6/14 (2006.01)
H02M 7/5395 (2006.01)
H02M 1/00 (2006.01)

(52) U.S. Cl.
CPC .............. *H02P 6/14* (2013.01); *H02M 7/5395* (2013.01); *H02M 2001/0054* (2013.01); *H02P 2209/09* (2013.01); *Y02B 70/1491* (2013.01); *H02P 6/145* (2013.01)

(58) Field of Classification Search
CPC .............. H02P 6/14; H02P 6/16; H02P 6/08; H02P 6/142
USPC ............... 318/400.13, 801; 363/41
See application file for complete search history.

(56) References Cited

U.S. PATENT DOCUMENTS 7,436,144 B2 * 10/2008 Yoshimura et al. ........... 318/599
8,222,857 B2   7/2012 Kitanaka (Continued)

FOREIGN PATENT DOCUMENTS

JP   6-22556 A    1/1994
JP   9-308256 A   11/1997

(Continued)

*Primary Examiner* — Paul Ip
*Assistant Examiner* — Gabriel Agared
(74) *Attorney, Agent, or Firm* — Birch, Stewart, Kolasch & Birch, LLP (57) ABSTRACT

A carrier generating unit applies a carrier that monotonically decreases to a switching control unit during either one of a first period that is a period immediately following a period in which a voltage command value is a value not more than a minimum value of the carrier, the voltage command value taking a first predetermined value larger than the minimum value of the carrier in the first period, and a second period that is a period immediately preceding a period in which the voltage command value is not less than a maximum value of the carrier, the voltage command value taking a second predetermined value smaller than the maximum value in the second period.

5 Claims, 9 Drawing Sheets (56) References Cited

U.S. PATENT DOCUMENTS

2006/0239047 A1* 10/2006 Yoshimura et al. ........... 363/102
2009/0161393 A1* 6/2009 Takahashi et al. .............. 363/41

FOREIGN PATENT DOCUMENTS

JP 4205157 B1 1/2009
WO WO 2007/113972 A1 10/2007

* cited by examiner

FIG. 15

POWER CONVERSION APPARATUS

TECHNICAL FIELD

The present invention relates to a power conversion apparatus, and more particularly to a technique of reducing a number of switching times of a switching element provided in a power conversion apparatus.

BACKGROUND ART

An inverter is used as an apparatus that applies AC voltage to a motor. The inverter converts inputted DC voltage into AC voltage, and outputs the AC voltage to the motor. The inverter described above is controlled based upon a comparison between a carrier and a command value. The command value is a command value involved with the output voltage of the inverter. A first command value V* is firstly generated based upon a rotating positional angle of the motor or a speed command. A second command value V** that is generated based upon the first command value V* is used for the comparison to the carrier. The second command value V** takes a fixed value for each predetermined periodic time (e.g., a periodic time of the carrier).

When a phase voltage with a rectangular wave is outputted from the inverter described above, the command value V* is a rectangular wave and has a periodic time same as the periodic time of the phase voltage. On the other hand, since the command value V* does not always have a fixed value for each predetermined periodic time, the command value V* is updated every predetermined periodic time to generate the command value V** that should be compared to the carrier. For example, FIG. 14 illustrates the periodic time of the carrier by a broken line, and as illustrated in this figure, the command value V* on each start of the periodic time is used as the command value V** for each periodic time of the carrier.

Figure 14:
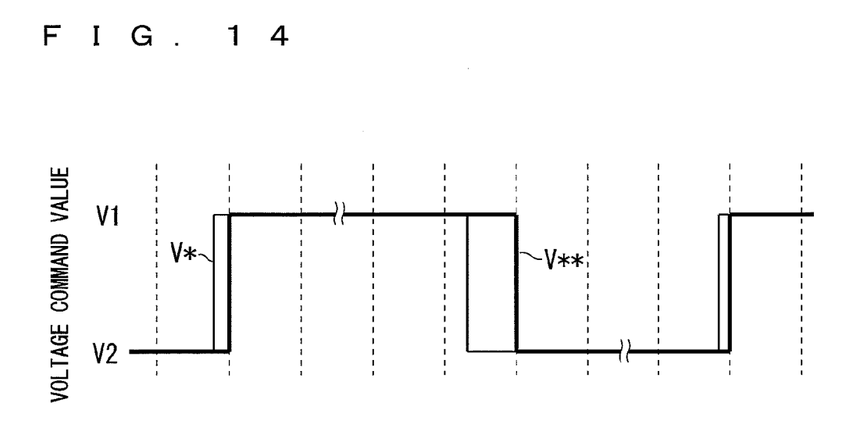
FIG. 14 is a view illustrating one example of a conventional voltage command value.

The inverter is controlled based upon the comparison between the command value V** and the carrier illustrated in FIG. 14, so that the inverter outputs the phase voltage V. In the phase voltage V described above, the period in which the phase voltage V takes the maximum value and the period in which the phase voltage takes the minimum value are different to each other. In other words, the phase voltage V has unbalance. A so-called offset is generated in a phase current outputted from the inverter due to the difference described above. In other words, the average in one periodic time of the phase current does not become zero.

As means for solving the problem described above, the technique described in Japanese Patent No. 4205157 can be employed. In Japanese Patent No. 4205157, when the balance of the output voltage is destroyed, the periodic time of the carrier is synchronized with the command value V*.

Japanese Patent Application Laid-Open No. 9-308256 is described as a technique involved with the present invention.

SUMMARY OF THE INVENTION

Problems to be Solved by the Invention

However, in the technique described in Japanese Patent No. 4205157, it is necessary to make the periodic time of the carrier equal to an integer fraction of the periodic time of the output voltage for allowing the carrier and the output voltage to be synchronized with each other, so that the periodic time of the carrier has to be changed. Therefore, the control is made complicated.

Figure 2:
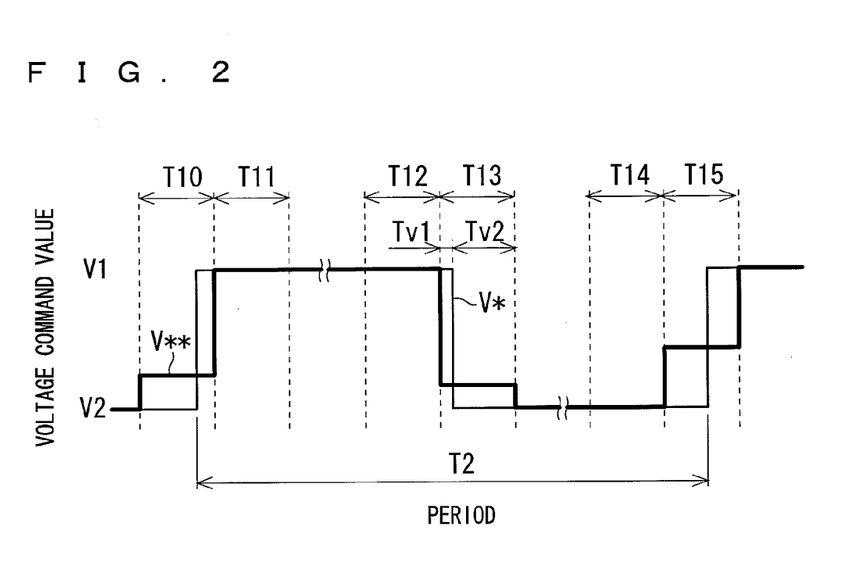
FIG. 2 is a view illustrating one example of a voltage command value.

Thus, it is considered that a voltage command value V** in FIG. 2 is generated by correcting the command value V*. The command value V in FIG. 2 takes a predetermined value during the period between the period in which it takes the maximum value V1 and the period in which it takes the minimum value V2. Thus, the average of the command value V in the periodic time T2 can be made close to the average of the command value V* in the periodic time T2, and further, can be made close to the average of the output voltage in the periodic time T2. With this, the unbalance in the output voltage can be reduced.

Figure 15:
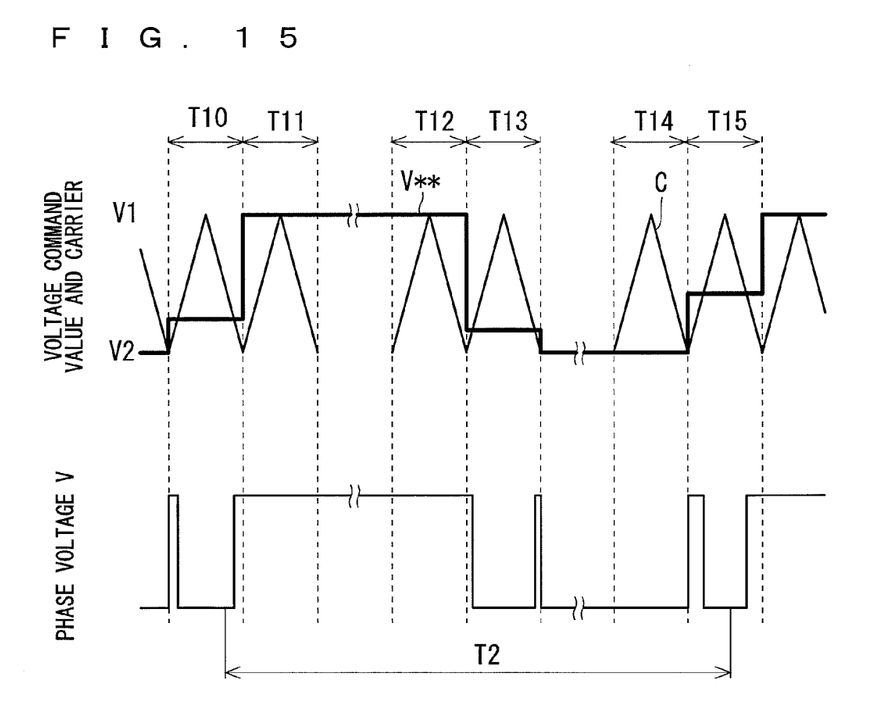
FIG. 15 is a view illustrating one example of the voltage command value, the carrier, and the output voltage.

On the other hand, if the switching element is controlled through the comparison between the command value V** described above and the carrier C with a wave of an isosceles triangle, the phase voltage V outputted from the inverter has three pulses in the period T2 as illustrated in FIG. 15. One of the pulses is formed by changing the switching pattern of the switching element of the inverter twice. Therefore, three pulses mean that the switching times of the switching element is six. The switching loss increases in proportion to the switching times described above.

In view of this, the present invention aims to provide a power conversion apparatus that can suppress the switching times by a simple control.

Means for Solving the Problems

The power conversion apparatus according to a first aspect of the present invention includes: a first input terminal (P1); a second input terminal (P2) to which a potential lower than a potential of the first input terminal is applied; an output terminal (Pu, Pv, Pw); a power converter conversion apparatus (1) including an upper switching element (S1 to S3) connected between the first input terminal and the output terminal, and a lower switching element (S4 to S6) connected between the second input terminal and the output terminal; a switching control unit (33) that controls the upper switching element and the lower switching element based upon a comparison between a voltage command value for an output voltage outputted from the power converter and a carrier having a predetermined periodic time; and a carrier generating unit (32) that gives the carrier (C1) monotonically decreasing to the switching control unit during either one of a first period (T11) that is a period immediately following a period in which the voltage command value is a value not more than a minimum value of the carrier, the voltage command value taking a first predetermined value larger than the minimum value of the carrier in the first period, and a second period (T13) that is a period immediately preceding a period in which the voltage command value is not less than a maximum value of the carrier, the voltage command value taking a second predetermined value smaller than the maximum value in the second periodic time, the first period and second period having the predetermined periodic time, and that gives the carrier (C2) monotonically increasing to the switching control unit during either one of a third period (T16) that is a period immediately following a period in which the voltage command value is a value not less than the maximum, the voltage command value taking a third predetermined value smaller than the maximum value in the third period, and a fourth period (T18) that is a period immediately preceding a period in which the voltage command value is not more than the minimum value, the voltage command value taking a fourth predetermined value larger than the minimum value in the fourth period, the third period and the fourth period having the predetermined period.

The power conversion apparatus according to a second aspect of the present invention is the power conversion apparatus according to the first aspect, wherein the voltage command value takes a value not less than the maximum value of the carrier during a period immediately following the first period, and takes a value not more than the minimum value of the carrier during a period immediately following the third period.

The power conversion apparatus according to a third aspect of the present invention is the power conversion apparatus according to the first or the second aspect further including: a voltage command generating unit (31) that generates the voltage command value (V**) by correcting a rectangular non-corrected voltage command value (V*), wherein the voltage command generating unit generates the voltage command value by correcting the non-corrected voltage command value during the period having the predetermined period to an intermediate value between the maximum value and the minimum value of the non-corrected voltage command value in the period.

The power conversion apparatus according to a fourth aspect of the present invention is the power conversion apparatus according to the third aspect, wherein the voltage command generating unit (31) generates the voltage command value (V**) by correcting the non-corrected voltage command value (V*) to its average every predetermined period.

Effects of the Invention

According to the first and second aspects of the power conversion apparatus of the present invention, the switching patterns of the upper switching element and the lower switching element are not changed before and after the boundary of two periods when the voltage command value reduces from the maximum value. The switching pattern is also not changed before and after the boundary of two periods when the voltage command value increases to the maximum value. Therefore, the switching times can be reduced.

According to the third aspect of the present invention, the average of the voltage command value can be made close to the average of the non-corrected voltage command value, compared to the case where the voltage command value is generated by correcting, every predetermined period, the non-corrected voltage command value to its maximum value or to its minimum value in each period.

According to the fourth aspect of the power conversion apparatus of the present invention, the average of the voltage command value can be made equal to the average of the non-corrected voltage command value in theory.

These and other objects, features, aspects and advantages of the present invention will become more apparent from the following detailed description of the present invention when taken in conjunction with the accompanying drawings.

EMBODIMENT FOR CARRYING OUT THE INVENTION

First Embodiment

Figure 1:
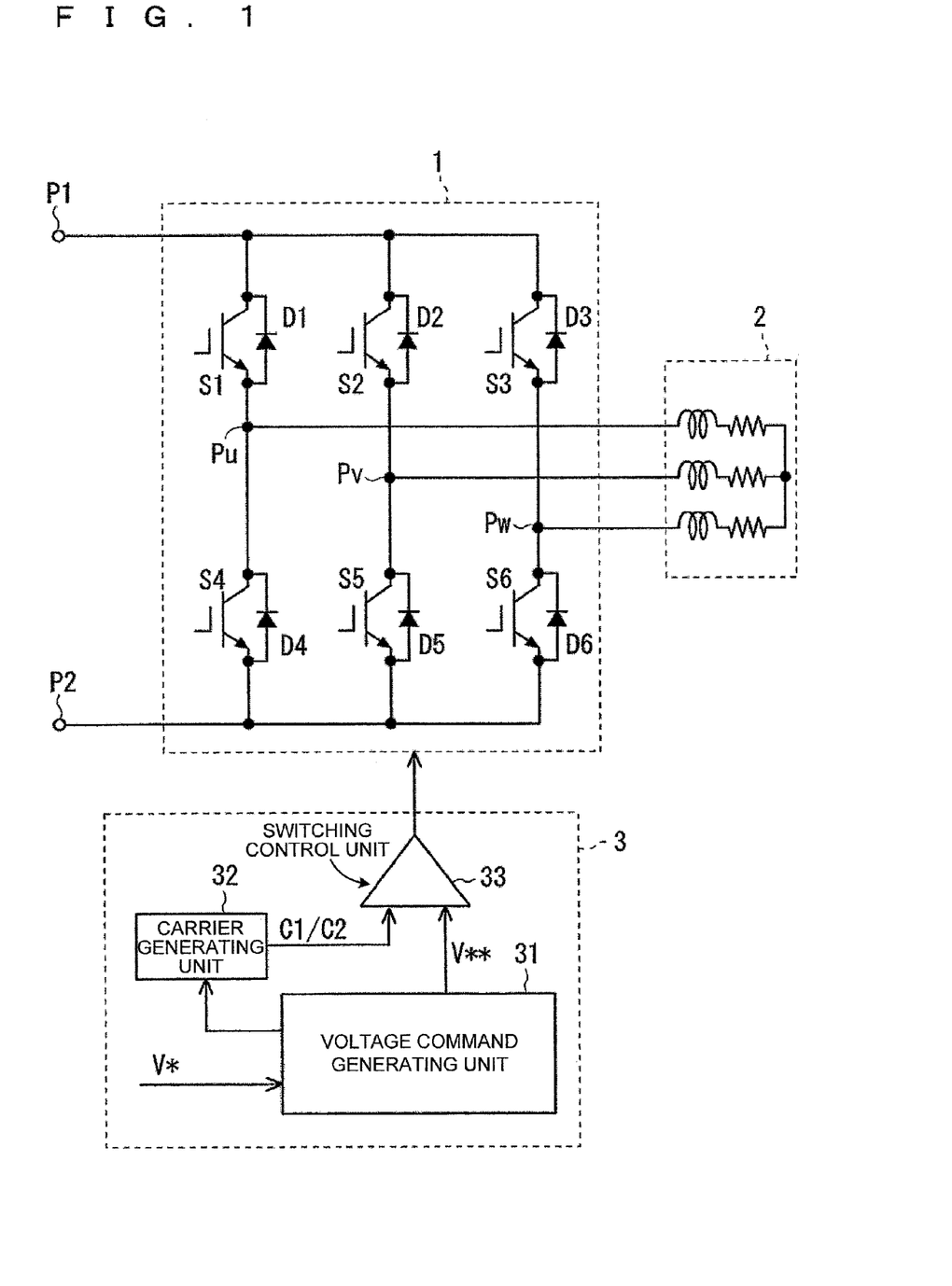
FIG. 1 is a view illustrating a conceptual configuration of an inverter.

As illustrated in FIG. 1, an inverter 1 is connected to input terminals P1 and P2, and output terminals Pu, Pv, and Pw. DC voltage is applied to the input terminals P1 and P2. In this case, the potential applied to the input terminal P2 is lower than the potential applied to the input terminal P1.

The inverter 1 converts DC voltage into AC voltage, and outputs the AC voltage to the output terminals Pu, Pv, and Pw. As one example of the more detailed configuration, the inverter 1 includes switching elements S1 to S6, and diodes D1 to D6. The switching elements S1 to S6 are insulating gate bipolar transistors or field-effect transistors, etc, for example. Each of the switching elements S1 to S3 is provided between each of the output terminals Pu, Pv, and Pw, and the input terminal P1. Each of the switching elements S1 to S3 is also referred to as an upper switching element below. Anodes of the diodes D1 to D3 are respectively connected to the output terminals Pu, Pv, and Pw, and the diodes D1 to D3 are respectively connected to the switching elements S1 to S3 in parallel. Each of the switching elements S4 to S6 is provided between each of the output terminals Pu, Pv, and Pw, and the input terminal P2. Each of the switching elements S4 to S6 is also referred to as a lower switching element below. Anodes of the diodes D4 to D6 are connected to the input terminal P2, and the diodes D4 to D6 are respectively connected to the switching elements S4 to S6 in parallel.

A switching signal is applied to each of the switching elements S1 to S6 from a control unit 3. Each of the switching elements S1 to S6 is made conductive by the switching signal described above. The inverter 1 converts the DC voltage into AC voltage by sending the switching signal to each of the switching elements S1 to S6 from the control unit 3 on an appropriate timing. According to the control by the control unit 3, the switching elements S1 and S4 are made mutually exclusively conductive, the switching elements S2 and S5 are made mutually exclusively conductive, and the switching elements S3 and S6 are made mutually exclusively conductive. This is for preventing high current from flowing through the switching element due to the short circuit of the input terminals P1 and P2.

The inverter 1 can drive an induced load 2, for example. The induced load 2 is connected to the output terminals Pu, Pv, and Pw. The induced load 2 is a motor, for example, and rotates according to the AC voltage applied by the inverter 1.

In the example in FIG. 1, the inverter 1 is connected to three output terminals Pu, Pv, and Pw. Specifically, the three-phase inverter 1 outputting three-phase AC voltage is illustrated in FIG. 1. However, the inverter 1 is not limited to the three-phase inverter, and it may be a single-phase inverter or three or more phase inverter. Here, the case in which the inverter 1 is a three-phase inverter described below.

The control unit 3 includes a voltage command generating unit 31, a carrier generating unit 32, and a switching control unit 33. Each of these units will briefly be described first, and then, each of these units will be describe in more detail.

The voltage command generating unit 31 generates a voltage command value V for the phase voltage (hereinafter also referred to as an output voltage) outputted from the inverter 1, and outputs the resultant to the switching control unit 33. In the example in FIG. 1, the inverter 1 outputs the three-phase AC voltage, so that the voltage command value V includes three phase voltage command values Vu, Vv, and Vw. The specific voltage command value V will be described in detail later.

The carrier generating unit 32 generates different carriers C1 and C2, each having a predetermined periodic time, and gives either one of the carriers C1 to C2 to the switching control unit 33.

The switching control unit 33 outputs the switching signals to the switching elements S1 to S6 based upon the comparison between the second voltage command value V from the voltage command generating unit 31 and the carrier from the carrier generating unit 32**.

Here, the control unit 3 is configured to include a microcomputer and a storage device. The microcomputer executes each processing step (in other words, procedure) written on a program. The storage device can be configured by one or plural of various storage devices including a ROM (Read Only Memory), a RAM (Random Access Memory), a rewritable non-volatile memory (EPROM (Erasable Programmable ROM), etc.), and a hard disk drive, for example. The storage device stores various information and data, and a program executed by the microcomputer, and provides a work area for executing the program. The microcomputer can be considered to function as various means corresponding to the respective steps written on the program, or can be considered to realize various functions corresponding to the respective processing steps. The control unit 3 is not limited thereto, and it is no problem that various procedures to be executed by the control unit 3, various means to be realized, or some or all of various functions are realized by hardware.

One example of the specific operation of the voltage command generating unit 31 will be described with reference to FIG. 2. The voltage command generating unit 31 generates the voltage command value V. In the example in FIG. 2, the period between adjacent two broken lines of plural broken lines has a predetermined periodic time T1. The voltage command value V rises from its minimum value V2 (e.g., zero) at the start of a period T10 to take a predetermined value, and rises at the end of the period T10 to take its maximum value V1. The voltage command value V takes the maximum value V1 from a period T11 following the period T10 until the period T12, falls at the start of a period T13 following the period T12 to take a predetermined value, and falls at the end of the period T13 to take the minimum value V2. The voltage command value V takes the minimum value V2 from the period following the period T13 until a period T14, rises again from the minimum value V2 at the start of a period T15 following the period T14 to take a predetermined value, and rises to the maximum value V1 at the end of the period T15.

In the example in FIG. 2, the shape of the voltage command value V is representatively illustrated. Actually, the voltage command value V contains phase-voltage command values Vu, Vv, and Vw**, and the phase of these values is shifted by 120 degrees from one another.

The voltage command value V illustrated in FIG. 2** is generated as described below, for example. Specifically, a non-corrected voltage command value V* (hereinafter merely referred to as the voltage command value V*) is inputted to the voltage command generating unit 31, and the voltage command value V* is corrected to generate the voltage command value V. In the example in FIG. 1, the inverter 1** outputs the three-phase AC voltage, so that the voltage command value V* includes three phase voltage command values Vu*, Vv*, and Vw*. The phases of the phase-voltage command values Vu*, Vv*, and Vw* are shifted by 120 degrees from one another.

The voltage command value V* is a rectangular wave, and alternately takes the maximum value V1 and the minimum value V2. Here, the period in which the voltage command value V* takes the maximum value V1 is equal to the period in which the voltage command value V* takes the minimum value V2. In the example in FIG. 2, the voltage command value V* rises from the minimum value V2 in the period T10 to take the maximum value V1, and falls from the maximum value V1 to take the minimum value V2 in the period T13. Then, the voltage command value V* again rises from the minimum value V2 in the period T15 to take the maximum value V1.

The voltage command generating unit 31 does not correct the voltage command value V*, when the voltage command value V* is not changed in each period. Specifically, the voltage command value V** is generated by employing the value of the voltage command value V* as it is. For example, the voltage command value V* takes the fixed value in the periods T11, T12, and T14 as illustrated in FIG. 2. Therefore, the voltage command value V** agrees with the voltage command value V* in these periods. When the voltage command value V* is changed in each period, for example, the voltage command generating unit 31 corrects the voltage command value V* in this period to an intermediate value between the maximum value and the minimum value of the voltage command value V* in this period to generate the voltage command value V**. For example, the voltage command value V* is changed in the periods T10, T13, and T15 as illustrated in FIG. 2. Therefore, the intermediate value between the maximum value V1 and the minimum value V2 is employed as the voltage command value V in these periods. The voltage command value V illustrated in FIG. 2 is generated according to the operation described above.

According to the operation described above, the microcomputer recognizing the value for each predetermined period T1 can recognize the voltage command value V* as the voltage command value V. When the voltage command value V is generated by correcting the voltage command value V*, the voltage command generating unit 31 can be considered as a voltage command value correcting unit.

Figure 3:
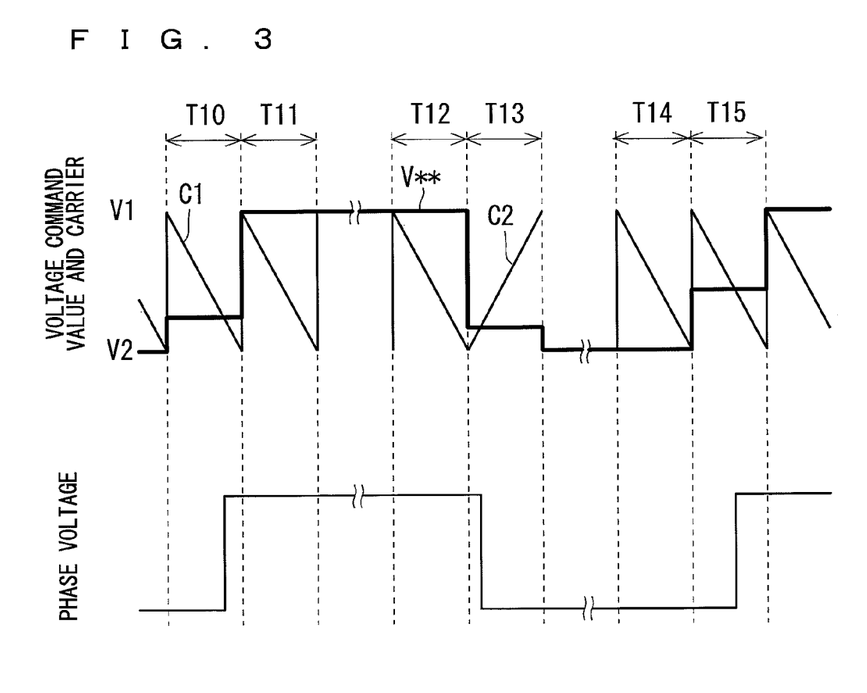
FIG. 3 is a view illustrating one example of the voltage command value, a carrier, and an output voltage.
Figure 4:
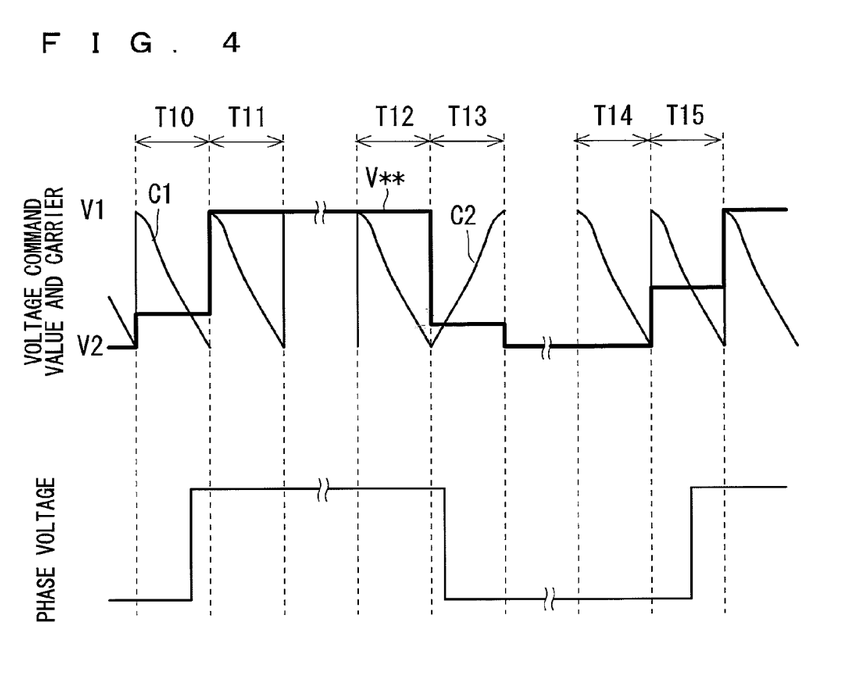
FIG. 4 is a view illustrating one example of the voltage command value, the carrier, and the output voltage.

The carrier generating unit 32 generates carriers C1 and C2 having the predetermined periodic time T1. More specifically, the carrier generating unit 32 generates the monotonically-decreasing carrier C1 that monotonically decreases in each period, and the monotonically-increasing carrier C2 that monotonically increases in each period as illustrated in FIG. 3. The periodic time of each of the carriers C1 and C2 is equal to the predetermined periodic time T1. The carrier C1 is a waveform whose tilt part is a negative waveform with a right triangle, for example, and it proportionally decreases from the maximum value V1 to the minimum value V2 in each period with time. The carrier C2 is a waveform whose tilt part is a positive waveform with a right triangle, for example, and it proportionally increases from the minimum value V2 to the maximum value V1 in each period with time. The carriers C1 and C2 are referred to as saw-tooth wave. It is unnecessary that the carriers C1 and C2 are proportional with time, and they may be curved as illustrated in FIG. 4. The same applies to the other embodiments described later, so that the description will not be repeated.

The carrier generating unit 32 outputs either one of the carriers C1 and C2 to the switching control unit 33 based upon the information (described later) from the voltage command generating unit 31.

The voltage command generating unit 31 generates the voltage command value V in the period prior to the period in which this voltage command value V is outputted. For example, the voltage command value V outputted during the period T11 is generated in the period T10 or in the previous periods. Accordingly, the voltage command generating unit 31 can recognize the voltage command value V outputted in a certain period and the voltage command value V outputted in the next period. When the next period is the period (e.g., the period T13) in which the voltage command value V falls from its maximum value V1 to take a first predetermined value, the voltage command generating unit 31 notifies the carrier generating unit 32 of this situation.

If there is no notification from the voltage command generating unit 31, the carrier generating unit 32 outputs the carrier C1 to the switching control unit 33. On the other hand, the notification is issued from the voltage command generating unit 31, the carrier generating unit 32 outputs the carrier C2 to the switching control unit 33 in the following period. Accordingly, in the examples in FIGS. 3 and 4, the carrier C2 is employed during the period T13.

The switching control unit 33 controls the switching elements S1 to S6 based upon the comparison between the voltage command value V and the carrier. For example, when the voltage command value V is not less than the carrier, the switching control unit 33 allows the upper switching element to be conductive, and the lower switching element to be non-conductive, while it allows the upper switching element to be non-conductive, and the lower switching element to be conductive, when the voltage command value V** is not more than the carrier.

The carrier C2 is employed by the operation of the voltage command generating unit 31 and the carrier generating unit 32 described above in the period (e.g., the period T13) in which the voltage command value V falls from the maximum value V1 to the predetermined value. Since the carrier C2 monotonically increases in this period, the voltage command value V becomes not less than the carrier C2 in the first half of this period. Therefore, the upper switching element becomes conductive, and the lower switching element becomes non-conductive in the first half of this period. On the other hand, the voltage command value V** takes the maximum value V1 in a period immediately preceding this period (e.g., the period T12), so that the voltage command value becomes not less than the carrier C1. Therefore, in this period, the upper switching element becomes conductive, while the lower switching element becomes non-conductive. Specifically, the switching pattern of the upper switching element and the lower switching element is not changed before and after the boundary of these two periods (e.g., the periods T12 and T13). In other words, the output voltage V keeps high potential without falling down before and after the boundary of these two periods.

The carrier C1 is employed in the period other than the period in which the voltage command value V falls from the maximum value V1 to the predetermined value. Therefore, the carrier C1 is also employed in the period (e.g., the periods T10 and T15) in which the voltage command value V rises from the minimum value V2 to the predetermined value. Since the carrier C1 monotonically decreases in these periods, the voltage command value V becomes not less than the carrier C1 in the latter half of these periods. Therefore, the upper switching element becomes conductive, and the lower switching element becomes non-conductive in the latter half of this period. On the other hand, the voltage command value Vtakes the maximum value V1 in the period (e.g., the period following the period T11 or T15) following this period, so that the upper switching element becomes conductive, while the lower switching element becomes non-conductive. Specifically, the switching pattern of the upper switching element and the lower switching element is not changed before and after the boundary of these two periods (e.g., the periods T10 and T11, and the period T15 and the following period). In other words, the output voltage V keeps high potential without falling down before and after the boundary of these two periods.

Since the voltage command value V** takes the minimum value V2 in the period following the period T13, the upper switching element becomes non-conductive, while the lower switching element becomes conductive. Since the carrier C2 is employed in the period T13 as described above, the upper switching element becomes non-conductive, while the lower switching element becomes conductive, in the latter half of this period. Accordingly, the switching pattern of the upper switching element and the lower switching element is not changed before and after the boundary of the period T13 and the following period. In other words, the output voltage V keeps low potential before and after the boundary of these two periods.

Since the voltage command value V** also takes the minimum value V2 in the period T14, the upper switching element becomes non-conductive, while the lower switching element becomes conductive. Since the carrier C1 is employed in the period T15 following the period T14 as described above, the upper switching element becomes non-conductive, while the lower switching element becomes conductive, in the first half of the period T15. Accordingly, the switching pattern of the upper switching element and the lower switching element is not changed before and after the boundary of the periods T14 and T15. In other words, the output voltage V keeps low potential before and after the boundary of these two periods.

Consequently, the inverter 1 outputs the output voltage V having only one pulse in one periodic time (i.e., in the periodic time T2) as illustrated in FIGS. 3 and 4. In other words, AC voltage can be outputted with the least switching times.

On the contrary, as described in Japanese Patent No. 4205157, when each of the point where the voltage command value V* falls and the point where the voltage command value V* rises is located on any one of the boundaries of the periods, the voltage command value V** has the shape same as that of the voltage command value V*. In this case, the inverter 1 can output the output voltage V having only one pulse in one periodic time, even if either carrier of the triangular wave and the wave with right triangle is employed. However, it is necessary that the predetermined periodic time T1 is made equal to an integer fraction of the periodic time T2 of the voltage command value V* in order to realize this operation. Therefore, the predetermined periodic time T1 has to be changed, every time the period T2 is changed, which brings difficult control. On the other hand, in the present embodiment, it is unnecessary that the predetermined periodic time T1 is made equal to an integer fraction of the periodic time T2, so that the control is easy.

In the examples in FIGS. 3 and 4, the maximum value V1 and the minimum value V2 of the voltage command value V agree with the maximum value and the minimum value of the carriers C1 and C2, respectively, but the present invention is not limited thereto. Briefly speaking, it is only necessary that the voltage command value V is not less than the maximum value of the carrier in the period in which the voltage command value V in FIGS. 3 and 4 takes the maximum value V1, and the voltage command value V is not more than the minimum value of the carrier C in the period in which the voltage command value V** in FIGS. 3 and 4 takes the minimum value V2.

This can be expressed as follows. The voltage command value V is not more than the minimum value of the carrier in at least one or more periods (e.g., the period prior to the period T10), and at the start of the period subsequent to this period (e.g., the period T10), it rises from a value not more than the minimum value of the carrier to take the predetermined value. The predetermined value is larger than the minimum value of the carrier, and smaller than the maximum value of the carrier. The voltage command value V rises at the end of this period to take the value not less than the maximum value of the carrier, and in at least one of periods subsequent to this period (e.g., the periods T11 to T12), it keeps the value not less than the maximum value of the carrier. At the start of the period subsequent to this period (e.g., the period T13), the voltage command value V falls to the predetermined value from the value not less than the maximum value of the carrier C. The predetermined value is also larger than the minimum value of the carrier, and smaller than the maximum value of the carrier. The voltage command value V falls at the end of this period to take the value not more than the minimum value of the carrier C, and in at least one or more periods, keeps the value not more than the minimum value of the carrier.

According to this, the inverter 1 outputs the output voltage V having only one pulse in one periodic time (i.e., the periodic time T2) as in FIGS. 3 and 4. In other words, AC voltage can be outputted with the least switching times. The same applies to the other embodiments described later, so that the description will not be repeated.

If there is no notification from the voltage command generating unit 31, the carrier generating unit 32 may output the carrier C2 to the switching control unit 33. In this case, the voltage command generating unit 31 gives notification to the carrier generating unit 32 as described below. Specifically, when the following period is the period (e.g., the period T10) in which the second voltage command value V** rises from the minimum value V2 to the predetermined value, the voltage command generating unit 31 notifies the carrier generating unit 32 of this situation. When receiving this notification, the carrier generating unit 32 outputs the carrier C1 to the switching control unit 33 in this following period. According to this, the inverter 1 can also output the output voltage V same as that in FIGS. 3 and 4.

Figure 5:
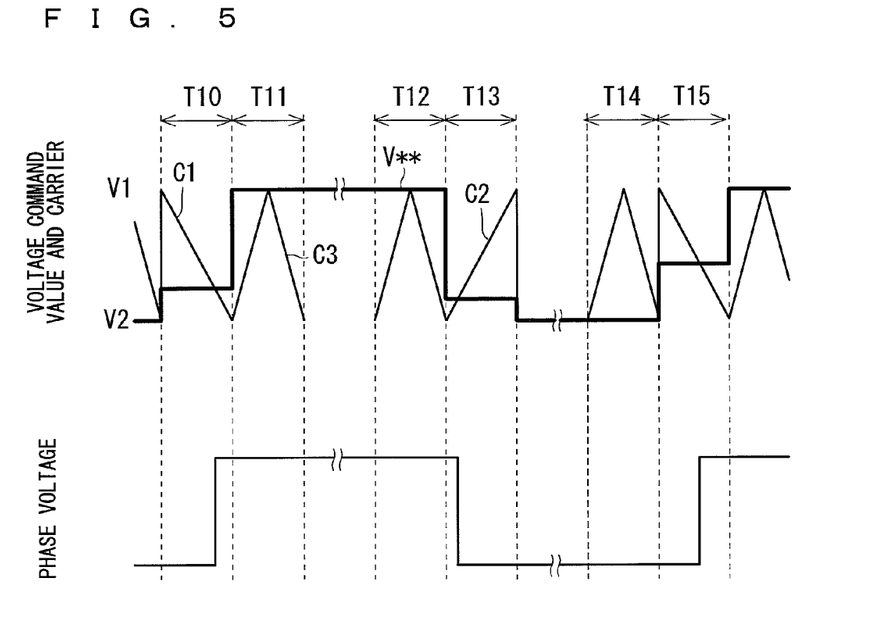
FIG. 5 is a view illustrating one example of the voltage command value, the carrier, and the output voltage.

The output voltage V keeps the high potential, regardless of the carrier, in the period (e.g., the periods T11 to T12) in which the voltage command value V takes the maximum value V1, and the output voltage V keeps the low potential, regardless of the carrier, in the period in which the voltage command value V takes the minimum value V2. Accordingly, as illustrated in FIG. 5, a carrier C3 with a wave of an isosceles triangle that has the period same as the control period T1 and that increases and decreases in each period may be employed, for example, in the period in which the voltage command value V** takes the maximum value V1 or the minimum value V2.

Essentially, it is only necessary that the carrier C1 monotonically decreasing is employed during the periods T10 and T15, while the carrier C2 monotonically increasing is employed during the period T13. Thus, the inverter 1 can output AC voltage with the least switching times.

Figure 6:
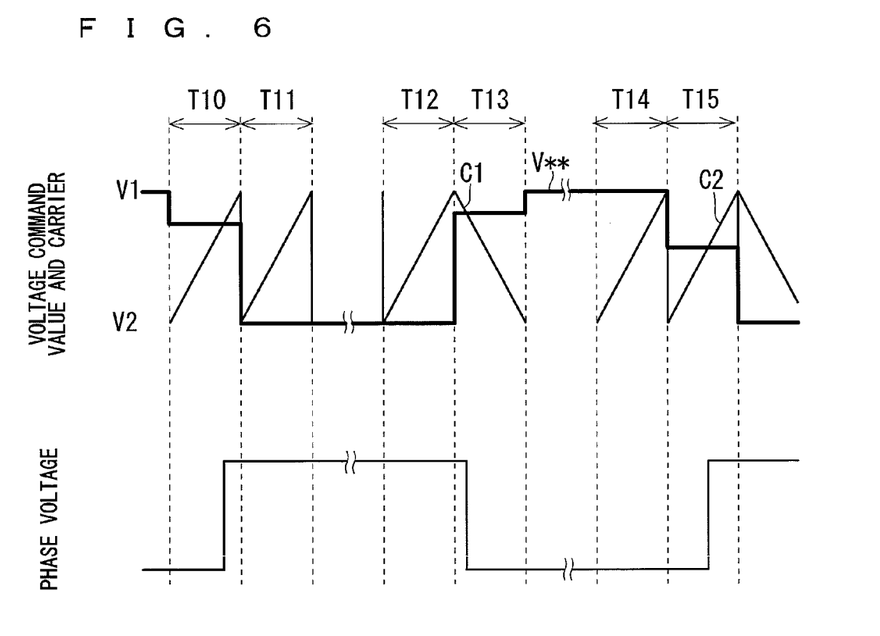
FIG. 6 is a view illustrating one example of the voltage command value, the carrier, and the output voltage.

The switching control unit 33 may allow the upper switching element to be conductive, and the lower switching element to be non-conductive, when the voltage command value V is not more than the carrier. FIG. 6 illustrates the voltage command value V, the carrier, and the output voltage V in this case.

The voltage command value V in FIG. 6 is formed by changing the voltage command value V in FIG. 2 to be vertically symmetrical. The carrier C1 that monotonically decreases is employed in the period (e.g., the period T13) in which the voltage command value V rises from the minimum value V2 to the predetermined value. Since the carrier C1 monotonically decreases in this period, the output voltage V keeps the high potential in the first half of this period. On the other hand, the voltage command value V takes the minimum value V2 in a period immediately preceding this period (e.g., the period T12), so that the output voltage V keeps the high potential. Therefore, the output voltage V keeps high potential without falling down before and after the boundary of these two periods (e.g., the periods T12 and T13).

The carrier C2 that monotonically increases is employed in the period (e.g., the period T10) in which the voltage command value V falls from the maximum value V1. Since the carrier C2 monotonically increases in this period, the output voltage V rises in the latter half of this period. On the other hand, the voltage command value V takes the minimum value V2 in the period following this period (e.g., the period T11), so that the output voltage V keeps the high potential. Therefore, the output voltage V keeps high potential without falling down before and after the boundary of these two periods (e.g., the periods T10 and T11).

Consequently, the inverter 1 outputs the output voltage V having only one pulse in one periodic time as illustrated in FIG. 6. In other words, AC voltage can be outputted with the least switching times, and the effect described with reference to FIGS. 3 and 4 can be brought.

If the voltage command generating unit 31 generates the voltage command value V** from the voltage command value V*, the inverter 1 can output the voltage close to the voltage command value V*, compared to the voltage command value V in FIG. 14. In other words, the average of the voltage command value V in the periodic time T2 can be made close to the average of the voltage command value V* in the periodic time T2. With this, the unbalance in the output voltage can be reduced.

It is desirable that the voltage command value V** takes the average of the voltage command value V* in each of the periods T10, T13, and T15. In other words, the intermediate value described above is the average of the voltage command value V* in each period. The average described above can be derived as described below. Specifically, it is supposed that, of these periods, the period in which the voltage command value V* takes the maximum value V1 is defined as Tv1, and, of these periods, the period in which the voltage command value V* takes the minimum value V2 is defined as Tv2

(=T1−Tv1). In this case, the voltage command value V** in each period satisfies the equations below.

$$V^{**}=(V1\cdot Tv1+V2\cdot Tv2)/T1 \quad (1)$$

If the voltage command value V descried above is employed, the average of the voltage command value V in the periodic time T2 can be made equal to the average of the voltage command value V* in the periodic time T2 in theory.

Further, since the average of the voltage command value V** in the periodic time T2 can be made close to the average of the voltage command value V* in the periodic time T2, the average of the output voltage V in the periodic time T2 can also be made close to the average of the voltage command value V*. In other words, the difference (unbalance) between the period in which the output voltage V takes the maximum value and the period in which the output voltage V takes the minimum value can be reduced. In the example in FIG. 2, the average of the voltage command value V** is equal to the average of the voltage command value V* in theory, the unbalance of the output voltage V can theoretically be eliminated.

When the predetermined periodic time T1 is set to be an integer fraction of the periodic time T2, the same effect can be brought by the control based upon the comparison between the voltage command value V* and the carrier. However, the predetermined periodic time T1 has to be changed based upon the periodic time T2, and hence, a calculation or process for changing the predetermined periodic time T1 is necessary. Accordingly, the control becomes complicated. On the other hand, according to the present embodiment, it is unnecessary to set the predetermined periodic time T1 as an integer fraction of the periodic time T2 of the voltage command value V*. Accordingly, the control can be simplified.

When the predetermined periodic time T1 is shortened, the unbalance can be reduced even by the control based upon the comparison between the voltage command value V* and the carrier. However, shortening the predetermined periodic time T1 increases the calculation processing power that is to be needed, and hence, entails increased production cost. On the other hand, according to the present embodiment, it is unnecessary to shorten the predetermined period T1, so that the increase in the production cost can be prevented.

<One Example of Specific Method of Generating Second Voltage Command Value V**>

Figure 7:
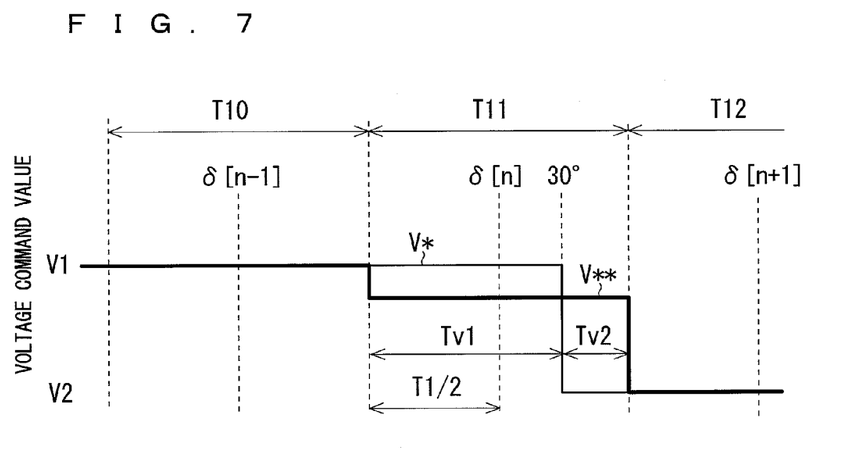
FIG. 7 is a view illustrating one example of the voltage command value.

It is supposed that the first voltage command value V* is a rectangular wave, falls at an electric angle of 30 degrees, and rises at an electric angle of 210 degrees. FIG. 7 illustrates one example of the voltage command value V* and the voltage command value V** as enlarged. FIG. 7 illustrates the neighborhood of the portion where the voltage command value V* falls. The voltage command value V* falls to the minimum value V2 from the maximum value V1 at the electric angle of 30 degrees.

The voltage command generating unit 31 generates the voltage command value V** by correcting the voltage command value V* for each control periodic time T1. For example, on the middle of each period, the voltage command value V** during the period following this period is generated.

When the electric angle of the voltage command value V* on the middle of each period is defined as δ [N] (N is an integer), the equation described below is satisfied geometrically.

$$\delta[n+1]-\delta[n]:30°-\delta[n]=T1:Tv1-T\tfrac{1}{2} \quad (2)$$

When the equation (2) is modified, the period Tv1 is derived, and when Tv2=T1−Tv1 is also considered, the period Tv2 is derived.

$$Tv1=T1\cdot(\tfrac{1}{2}+(30°-\delta[n])/(\delta[n+1]-\delta[n])) \quad (3)$$

$$Tv2=T1\cdot(\tfrac{1}{2}-(30°-\delta[n])/(\delta[n+1]-\delta[n])) \quad (4)$$

Here, when it is supposed that the control periodic time T1 is constant, and the periodic time T2 of the voltage command value V* is constant, δ[n+1]−δ[n]=δ[n]−δ[n−1]=k (constant) (n is an integer) is established. This supposition means that the motor, which is one example of the induced load 2, is driven with a constant revolution speed, for example. When the equations (3) and (4) are modified in consideration of δ[n+1]−δ[n]=δ[n]−δ[n−1]=k, the equation described below is derived.

$$Tv1=T1\cdot(\tfrac{1}{2}+(30°-\delta[n-1]-k)/k) \quad (5)$$

$$Tv2=T1\cdot(\tfrac{1}{2}-(30°-\delta[n-1]-k)/k) \quad (6)$$

The voltage command generating unit 31 can obtain the voltage command value V during the period T11 by substituting these periods Tv1 and Tv2 into the equation (1). When δ[n] and δ[n+1] are known on the point of calculating the voltage command value V during the period T11, the voltage command value V** may be calculated by using the equations (3) and (4).

Figure 8:
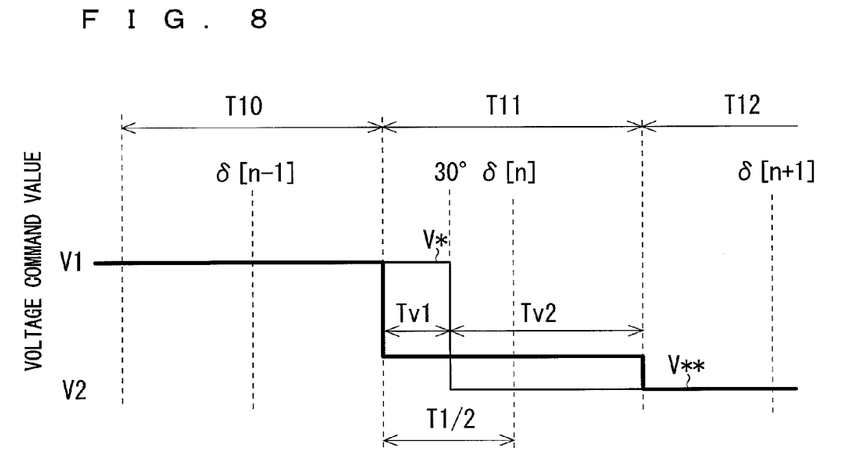
FIG. 8 is a view illustrating one example of the voltage command value.

FIG. 8 illustrates another example of the voltage command value V* and the voltage command value V** as enlarged. FIG. 8 illustrates the neighborhood of the portion where the voltage command value V* falls. The voltage command value V* falls to the minimum value V2 from the maximum value V1 at the electric angle of 30 degrees, for example. Compared to the example in FIG. 7, the electric angle δ[n] is larger than the electric angle (e.g., 30 degrees) when the voltage command value V* falls. In this case, the equation described above is satisfied geometrically, for example.

$$\delta[n]-\delta[n-1]:\delta[n]-30°=T1:T\tfrac{1}{2}-Tv1 \quad (7)$$

The equation (7) is expressed by using the electric angles of δ[n] and δ[n−1]. Specifically, the electric angles δ[n] and δ[n−1] that are close to the point when the voltage command value V* rises are employed. When the equation (7) is modified, the period Tv1 is derived, and when Tv2=T1−Tv1 is also considered, the period Tv2 is derived.

$$Tv1=T1\cdot(\tfrac{1}{2}+(30°-\delta[n])/(\delta[n]-\delta[n-1])) \quad (8)$$

$$Tv2=T1\cdot(\tfrac{1}{2}-(30°-\delta[n])/(\delta[n]-\delta[n-1])) \quad (9)$$

When it is supposed that the electric angle speed is not sharply changed, δ[n+1]−δ[n]=δ[n]−δ[n−1]=k is established. When the equations (8) and (9) are modified by using this equation, the equations (5) and (6) are derived.

The voltage command generating unit 31 can obtain the voltage command value V during the period T11 by substituting these periods Tv1 and Tv2 into the equation (1). When δ[n−1] and δ[n] are known on the point of calculating the voltage command value V during the period T11, the voltage command value V** may be calculated by using the equations (8) and (9).

Although it is supposed that the voltage command value V* falls at the electric angle of 30 degrees, it may fall at any electric angle. In the equations (2) to (9), "30°" may be replaced by any electric angle.

The voltage command value V* at the point δ is used in the above-mentioned example, however, when the voltage command value V* takes one value for each control periodic time T1, this value may be used. When the voltage command value V* is generated in the program executed by the microcomputer in the control unit 3, for example, one voltage command value V* is generated for each control periodic time T1, for example.

The above-mentioned equations are not necessarily used, and the voltage command value V** may be generated based upon any two or all of the voltage command value V* during the current control period T1 and the voltage command values V* during the control periods prior to and subsequent to the current control period.

Second Embodiment

Figure 9:
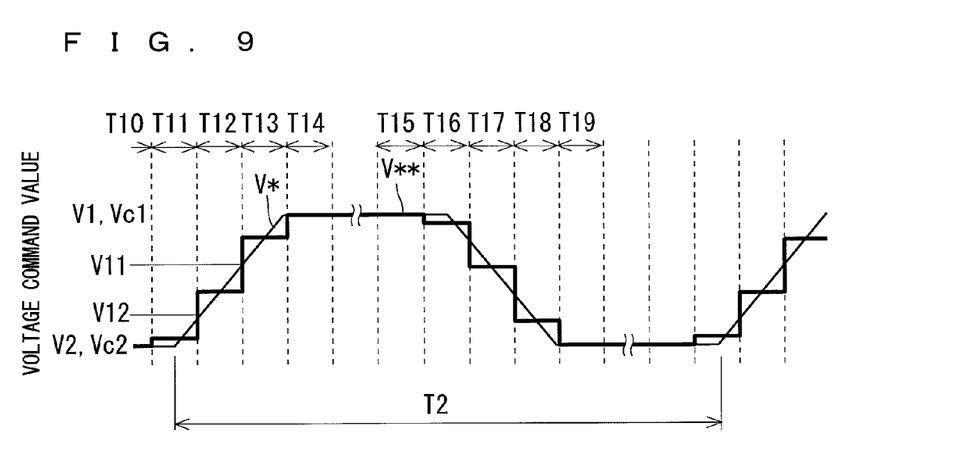
FIG. 9 is a view illustrating one example of the voltage command value.
Figure 10:
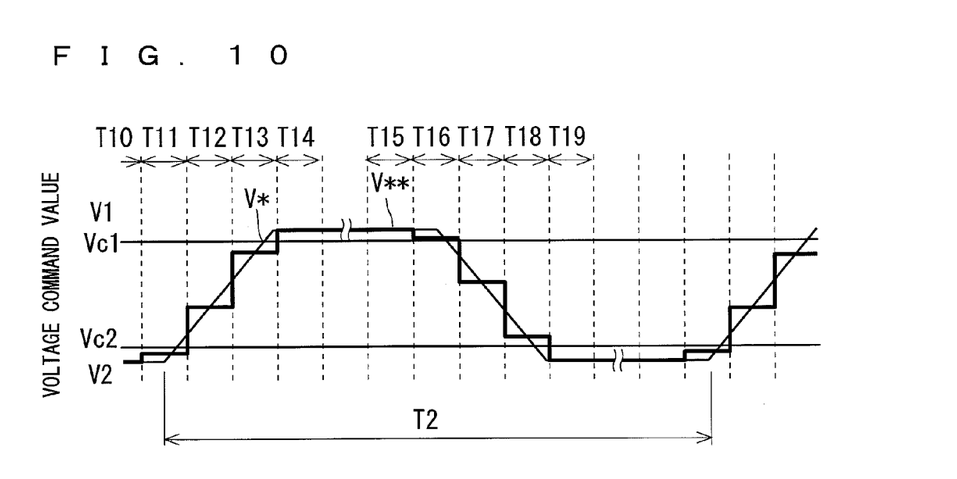
FIG. 10 is a view illustrating one example of the voltage command value.

A configuration of an inverter according to a second embodiment is the same as that illustrated in FIG. 1. In the second embodiment, the voltage command value V is generated as illustrated in FIG. 9 or FIG. 10. The voltage command value V has a pair of flat sections taking a fixed value, and step-like sections having a shape of steps (periods T11 to T13, and periods T16 to T18) that link the pair of flat sections. In the example in FIG. 9, the maximum value V1 and the minimum value V2 of the voltage command value V** agree with the maximum value Vc1 and the minimum value Vc2 of the carrier, respectively. On the other hand, in the example in FIG. 10, the maximum value V1 is larger than the maximum value Vc1, and the minimum value V2 is smaller than the minimum value Vc2. Specifically, the maximum value V1 may be not less than the maximum value Vc1, and the minimum value V2 may be not more than the minimum value Vc2.

The voltage command value V** described above can be generated by correcting the voltage command value V* having a trapezoidal wave, for example. One example of this will be described below in detail. As in the first embodiment, when the voltage command value V* is constant in each period having the control periodic time T1, the voltage command generating unit 31 employs the voltage command value V* as it is to generate the voltage command value V. Therefore, the voltage command value V agrees with the voltage command value V* in these periods.

When the voltage command value V* is not less than the maximum value Vc1 or not more than the minimum value Vc2 of the carrier C in each period, the voltage command value V** may be generated by employing the voltage command value V* as it is. Alternatively, the process described below may be carried out. In the example in FIG. 9, the voltage command value V* is not less than the maximum value Vc1 of the carrier during the period T14, for example. Therefore, the voltage command value V during the period T14 may be any value not less than the maximum value Vc1. Similarly, the voltage command value V may be any value not more than the minimum value Vc2 during the period in which the voltage command value V* is not more than the minimum value Vc2 of the carrier. When the voltage command value V* crosses the maximum value Vc1 during the period, or when the voltage command value V* crosses the minimum value Vc2 during the period, a value larger than the minimum value of the voltage command value V* and smaller than the maximum value during this period (e.g., the periods T13 and T16) may be employed as the voltage command value V** in the periods. When the average of the voltage command value V* in this period exceeds the maximum value Vc1, the voltage command value V** in this period may take any value not less than the maximum value Vc1. When the average of the voltage command value V* in this period is less than the minimum value Vc2, the voltage command value V** in this period may take any value not more than the minimum value Vc2.

When the voltage command value V* is changed in each period between the value not less than the minimum value Vc2 and the value not more than the maximum value Vc1, the voltage command generating unit 31 corrects the voltage command value V* in this period to an intermediate value between the maximum value and the minimum value of the voltage command value V* in this period to generate the voltage command value V. For example, the voltage command value V during the period T12 in FIG. 9 is the intermediate value between the maximum value V11 and the minimum value V12 of the voltage command value V* during the period T12, for example.

According to the voltage command value V described above, the average of the voltage command value V in the period T2 can be made close to the average of the voltage command value V* in the period T2 as in the first embodiment, and hence, the effect same as that in the first embodiment can be obtained.

Figure 11:
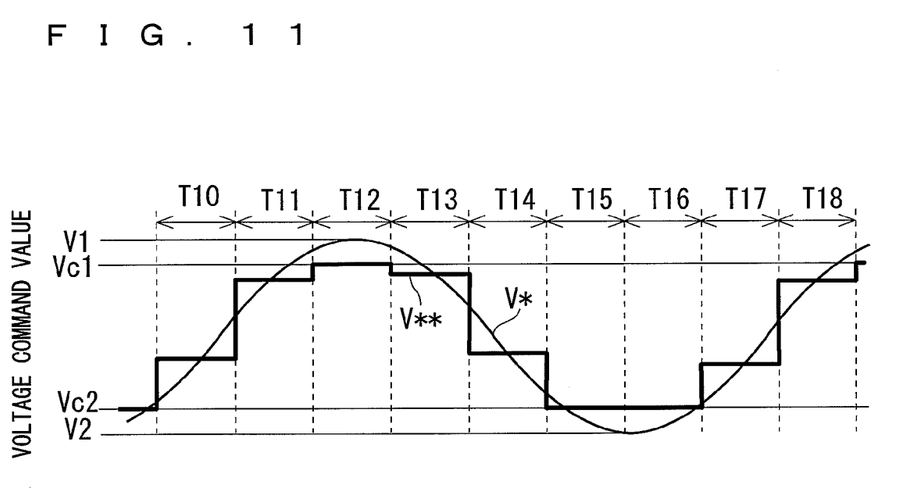
FIG. 11 is a view illustrating one example of the voltage command value.

The voltage command value V** may be generated by correcting the sine wave voltage command value V* as illustrated in FIG. 11. In FIG. 11, each period is exaggerated with respect to the periodic time of the sine wave. As illustrated in FIG. 11, at least one of periods in which the voltage command value V* becomes not less than the maximum value Vc1 of the carrier is present, and at least one of periods in which the voltage command value V* becomes not more than the minimum value Vc2 of the carrier is present. The voltage command value V** illustrated in FIG. 11 can be generated by correcting the sine wave voltage command value V* as described above, for example.

Figure 12:
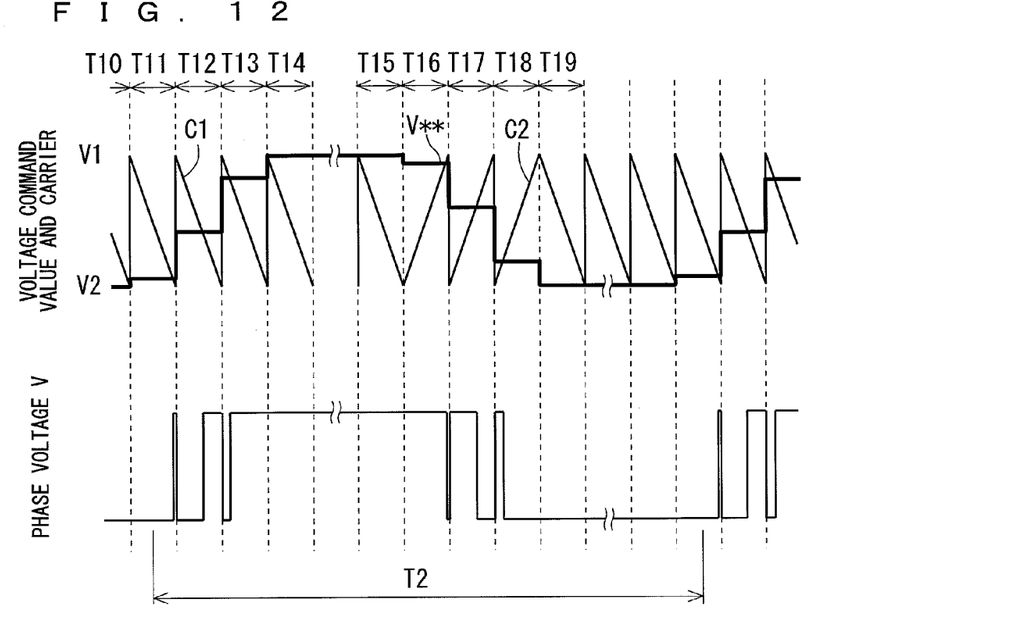
FIG. 12 is a view illustrating one example of the voltage command value, the carrier, and the output voltage.

FIG. 12 is a view illustrating one example of the voltage command value, the carrier, and the output voltage. Although the case where the voltage command value V in FIG. 9 is employed is described below, the content described below can be applied to the case where the voltage command value V illustrated in FIGS. 10 and 11 is employed. As illustrated in FIG. 12, the carrier generating unit 32 outputs the carrier C1 to the switching control unit 33 in general.

When the voltage command value V takes the value not less than the maximum value Vc1 during a certain period (e.g., during the period T15), and the voltage command value V takes a value smaller than the maximum value Vc1 and larger than the minimum value Vc2 during the following period (e.g., the period T16), the voltage command generating unit 31 notifies the carrier generating unit 32 of this situation. In other words, during the period in which the voltage command value V falls from the value not less than the maximum value Vc1 to the value, and takes this value, the voltage command generating unit 31 notifies the carrier generating unit 32 of this situation. Alternatively, when the voltage command value V takes the value not more than the minimum value Vc2 during a certain period (e.g., during the period T19), and the voltage command value V** takes a value smaller than the maximum value Vc1 and larger than the minimum value Vc2 during a period (e.g., the period T18) immediately preceding this period, the voltage command generating unit 31 notifies the carrier generating unit 32 of this situation.

The carrier generating unit 32 receiving this notification outputs the carrier C2 to the switching control unit 33 during the following period (e.g., the period T16) or the previous period (the period T18).

In the example in FIG. 12, if the carrier C2 is employed during the period T16, the phase voltage V keeps a high potential before and after the boundary of the periods T15 and T16. Therefore, the switching pattern is not changed before and after this boundary. Accordingly, the number of switching times can be reduced. In the example in FIG. 12, even in the period (e.g., periods T17 and T18) in which the voltage command value V** tends to decrease, and takes the intermediate value, the carrier generating unit 32 outputs the carrier C2 to the switching control unit 33. If the carrier C2 is employed during the period T16, for example, the carrier during the periods T17 and T18 may be any triangular wave. If the carrier C2 is employed during the period T18, the phase voltage V keeps a low potential before and after the boundary of the periods T18 and T19. Therefore, the switching pattern is not changed before and after this boundary. Accordingly, the number of switching times can be reduced. If the carrier C2 is employed during the period T18, the carrier during the periods T16 and T17 may be any triangular wave.

According to the control described above, the number of pulses can be reduced by one before and after the longest pulse having the periods in which the voltage command value V** takes the value not less than the maximum value Va. The reason of this can be understood from the description for FIG. 3, so that the detailed description will be omitted. Accordingly, the number of switching times can be reduced.

As in the first embodiment, the carrier generating unit 32 may generally output the carrier C2 to the switching control unit 33, and may output the carrier C1 to the switching control unit 33 during the period (e.g., the period T13) that is a period immediately following the period (e.g., the period T14) in which the voltage command value V takes the value not less than the maximum value Vc1, the voltage command value V taking the value smaller than the maximum value Vc1 and larger than the minimum value Vc2 in the period (e.g., the period T13), or during the period (e.g., the period T11) in which the voltage command value V** rises from the value not more than the minimum value Vc2 to the value smaller than the maximum value Vc1 and larger than the minimum value Vc2, and takes this value.

In the example in FIG. 12, if the carrier C1 is employed during the period T13, the phase voltage V keeps a high potential before and after the boundary of the periods T13 and T14. Therefore, the switching pattern is not changed before and after this boundary. Accordingly, the number of switching times can be reduced. In the example in FIG. 12, even in the period (e.g., periods T11 and T12) in which the voltage command value V** tends to increase, and takes the intermediate value, the carrier generating unit 32 outputs the carrier C1 to the switching control unit 33. If the carrier C1 is employed during the period T13, the carrier during the periods T11 and T12 may be any triangular wave. If the carrier C1 is employed during the period T11, the phase voltage V keeps a low potential before and after the boundary of the periods T10 and T11. Therefore, the switching pattern is not changed before and after this boundary. Accordingly, the number of switching times can be reduced. If the carrier C1 is employed during the period T11, the carrier during the periods T12 and T13 may be any triangular wave.

Figure 13:
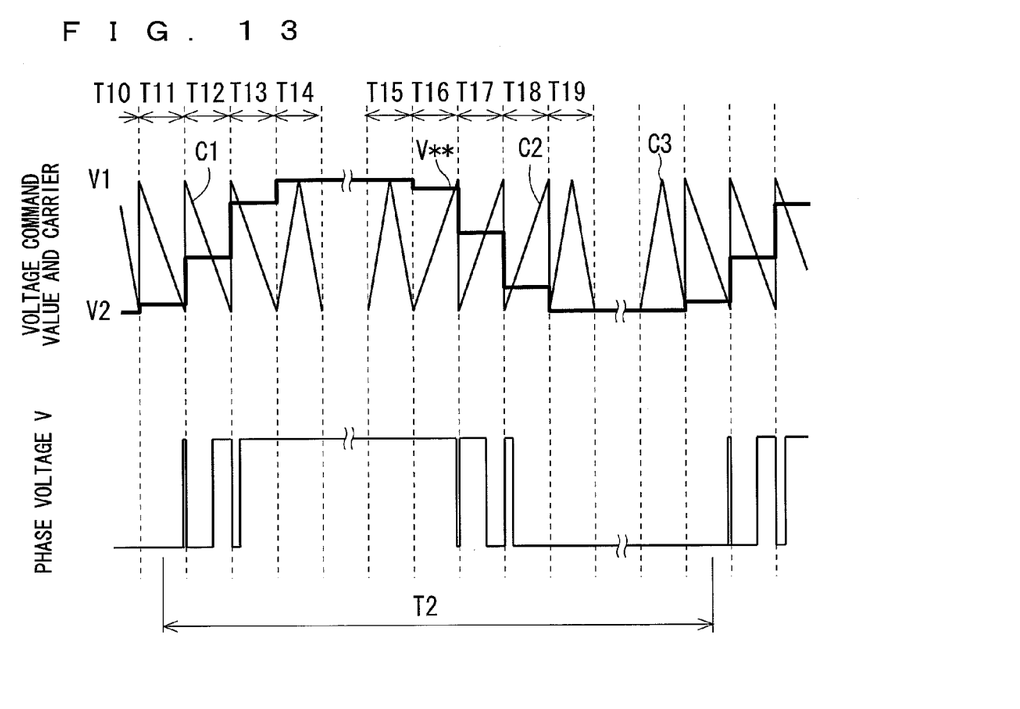
FIG. 13 is a view illustrating one example of the voltage command value, the carrier, and the output voltage.

As in the first embodiment, the phase voltage V keeps the high potential, regardless of the shape of the carrier, in the period in which the voltage command value V takes the value not less than the maximum value Vc1, and the phase voltage V keeps the low potential, regardless of the shape of the carrier, in the period in which the voltage command value V takes the value not more than the minimum value Vc2. Accordingly, as illustrated in FIG. 13, a carrier C3 with a wave of an isosceles triangle that increases and decreases in each period may be employed, for example, in the periods described above.

When the carrier C is not less than the voltage command value V**, the upper switching element may be made conductive. Even in this case, the number of switching times can be reduced, if the carriers C1 and C2 are employed under the condition described above.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 INVERTER
C, C1, C2 CARRIER
P1, P2 INPUT TERMINAL
Pu, Pv, Pw OUTPUT TERMINAL
S1~S6 SWITCHING ELEMENT

The invention claimed is:
1. A power conversion apparatus comprising:
a first input terminal;
a second input terminal to which a potential lower than a potential of said first input terminal is applied;
an output terminal;
a power converter including an upper switching element connected between said first input terminal and said output terminal, and a lower switching element connected between said second input terminal and said output terminal;
a switching control unit that controls said upper switching element and said lower switching element based upon a comparison between a voltage command value for an output voltage outputted from said power converter and a carrier having a predetermined periodic timing;
a carrier generating unit that provides said carrier to said switching control unit; and
a voltage command generating unit that generates said voltage command value by correcting a non-corrected voltage command value, wherein:
said carrier generating unit provides said carrier monotonically decreasing to said switching control unit during at least one of the following periods of said predetermined periodic timing:
a first period that is a period immediately following a period in which said voltage command value is a value not more than a minimum value of said carrier, said voltage command value taking a first predetermined value larger than the minimum value of said carrier in the first period, and
a second period that is a period immediately preceding a period in which said voltage command value is not less than a maximum value of said carrier, said voltage command value taking a second predetermined value smaller than said maximum value in the second period;
said carrier generating unit provides said carrier monotonically increasing to said switching control unit during at least one of the following periods of said predetermined periodic timing:
a third period that is a period immediately following a period in which said voltage command value is a value not less than said minimum value, said voltage command value taking a third predetermined value smaller than said maximum value in the third period, and
a fourth period that is a period immediately preceding a period in which said voltage command value is not more than said minimum value, said voltage com- mand value taking a fourth predetermined value larger than said minimum value in the fourth period;

wherein said voltage command value takes a value not less than said maximum value of said carrier during a period immediately following said first period, and takes a value not more than said minimum value of said carrier during a period immediately following said third period; and said voltage command generating unit generates said voltage command value by correcting said non-corrected voltage command value during a given period of said predetermined periodic time to an intermediate value between said maximum value and said minimum value of said carrier in said given period.

2. The power conversion apparatus according to claim 1, wherein said voltage command generating unit generates said voltage command value by correcting said non-corrected voltage command value to its average every period of said predetermined periodic timing.

3. A power conversion apparatus comprising:

a first input terminal;

a second input terminal to which a potential lower than a potential of said first input terminal is applied;

an output terminal;

a power converter including an upper switching element connected between said first input terminal and said output terminal, and a lower switching element connected between said second input terminal and said output terminal;

a switching control unit that controls said upper switching element and said lower switching element based upon a comparison between a voltage command value for an output voltage outputted from said power converter and a carrier having a predetermined periodic timing;

a carrier generating unit that provides said carrier to said switching control unit; and a voltage command generating unit that generates said voltage command value by correcting a non-corrected voltage command value, wherein:

said carrier generating unit provides said carrier monotonically decreasing to said switching control unit during at least one of the following periods of said predetermined periodic timing:

a first period that is a period immediately following a period in which said voltage command value is a value not more than a minimum value of said carrier, said voltage command value taking a first predetermined value larger than the minimum value of said carrier in the first period, and a second period that is a period immediately preceding a period in which said voltage command value is not less than a maximum value of said carrier, said voltage command value taking a second predetermined value smaller than said maximum value in the second period;

said carrier generating unit provides said carrier monotonically increasing to said switching control unit during at least one of the following periods of said predetermined periodic timing:

a third period that is a period immediately following a period in which said voltage command value is a value not less than said minimum value, said voltage command value taking a third predetermined value smaller than said maximum value in the third period, and a fourth period that is a period immediately preceding a period in which said voltage command value is not more than said minimum value, said voltage command value taking a fourth predetermined value larger than said minimum value in the fourth period; and said voltage command generating unit generates said voltage command value by correcting said non-corrected voltage command value during a given period of said predetermined periodic timing to an intermediate value between said maximum value and said minimum value of said carrier in said given period.

4. The power conversion apparatus according to claim 3, wherein said voltage command value takes a value not less than said maximum value of said carrier during a period immediately following said first period, and takes a value not more than said minimum value of said carrier during a period immediately following said third period.

5. The power conversion apparatus according to claim 3, wherein said voltage command generating unit generates said voltage command value by correcting said non-corrected voltage command value to its average every period of said predetermined periodic time.

* * * * *